(12) United States Patent
Bekerman (10) Patent No.: US 10,341,629 B2
(45) Date of Patent: Jul. 2, 2019

(54) TOUCH SCREEN WIFI CAMERA

(71) Applicant: HIPCAM LTD., Yehud OT (IL)

(72) Inventor: Damian Bekerman, Givat Shumuel (IL)

(73) Assignee: HIPCAM LTD., Givat Shmuel (IL)

( * ) Notice: Subject to any disclaimer, the term of this patent is extended or adjusted under 35 U.S.C. 154(b) by 0 days.

(21) Appl. No.: 15/638,523

(22) Filed: Jun. 30, 2017

(65) Prior Publication Data

US 2018/0007331 A1  Jan. 4, 2018

Related U.S. Application Data

(60) Provisional application No. 62/356,557, filed on Jun. 30, 2016.

(51) Int. Cl.
| | |
|---|---|
| *H04N 5/232* | (2006.01) |
| *G08B 13/196* | (2006.01) |
| *H04N 9/64* | (2006.01) |
| *G03B 17/02* | (2006.01) |
| *H04N 5/225* | (2006.01) |
| *G06F 3/041* | (2006.01) |
| *H04W 88/02* | (2009.01) |
| *H04N 5/262* | (2006.01) |
| *H04N 7/18* | (2006.01) |
| *G06F 3/0488* | (2013.01) |

(52) U.S. Cl.
CPC ............. *H04N 9/64* (2013.01); *G03B 17/02* (2013.01); *G06F 3/0416* (2013.01); *G08B 13/19617* (2013.01); *G08B 13/19656* (2013.01); *H04N 5/2252* (2013.01); *H04N 5/23206* (2013.01); *H04N 5/23216* (2013.01); *H04N 5/23293* (2013.01); *H04N 5/2624* (2013.01); *H04N 7/18* (2013.01); *H04N 7/183* (2013.01); *H04W 88/021* (2013.01); *G06F 3/0488* (2013.01)

(58) Field of Classification Search
CPC ..... H04N 9/64; H04N 5/2252; H04W 88/021; G06F 3/0488; G06F 3/0416; G03B 17/02
See application file for complete search history.

(56) References Cited

U.S. PATENT DOCUMENTS

| | | |
|---|---|---|
| 9,253,340 B2 | 2/2016 | Bednarczyk et al. |
| 2012/0327225 A1 | 12/2012 | Barley et al. |
| 2013/0188047 A1 | 7/2013 | Slevin et al. |
| 2014/0009627 A1* | 1/2014 | Tanaka ............... H04N 1/00204 348/207.1 |
| 2015/0381859 A1* | 12/2015 | Cover ................. H04N 5/2252 348/374 |
| 2016/0100090 A1 | 4/2016 | Konicek |
| 2016/0182864 A1* | 6/2016 | Izawa ..................... H04N 5/44 348/159 |

* cited by examiner

*Primary Examiner* — Mekonnen D Dagnew
(74) *Attorney, Agent, or Firm* — Mark M. Friedman (57) ABSTRACT

An in-place imaging device, including: a housing and a support stand, the housing including: a camera; a wireless communication module; a touch sensitive screen configured for displaying content and receiving input; and a processing unit; wherein the imaging device is adapted to capture footage with the camera and transmitting the footage via the wireless communication module to a network access point. The footage is transmitted to a media server via a communications network to which the network access point is connected.

20 Claims, 7 Drawing Sheets

TOUCH SCREEN WIFI CAMERA

FIELD OF THE INVENTION

The present invention relates to a WiFi camera and, more particularly, to a WiFi camera with a touch screen.

BACKGROUND OF THE INVENTION

An Internet protocol (IP) camera is a type of digital video camera commonly employed for surveillance, and which, unlike analog closed circuit television (CCTV) cameras, can send and receive data via a computer network and the Internet. IP cameras (also termed "nanny cams") are often used for indoor surveillance. In order for the camera to have an autonomous connection to the Internet, and not be dependent on a computer that is connected to the network, the IP camera has its own connection to internet, usually via a wireless connection to a WiFi router. These cameras are also considered WiFi cameras. However, IP cameras need to be set up on the local router as a standalone connection that is recognized on the home network. Therefore, IP cameras are usually installed by computer professionals and frequently cause problems that only IT technicians or specialists can solve.

A remote camera, sometimes called a trail camera when used to capture photographs or video in nature, is a camera placed by a photographer in areas where the photographer generally cannot be in person. This includes areas with limited access, tight spaces where a person is not allowed, or just another angle so that the photographer can simultaneously take pictures of the same moment from different locations. Trail cameras are often set up in remote locations with some kind of triggering device. One type of triggering device is a timer. Another device is a motion sensor. A third device is a noise sensor. Many other triggering devices exist.

Remote cameras either have local storage for the captured footage, such as a removable SD card, or a connection to the Internet, in order to upload the footage to a remote storage facility such as cloud storage. For the local storage option, the camera needs to be physically visited on a periodic basis in order to replace the memory card or copy the footage and clear the card. For the wireless connection and automatic upload, the device usually has a cellular chip (with SIM card) or a satellite connection for very remote areas. The system must be robust (to withstand the outdoor elements such as wind, rain, dust and the like) and have very good power efficiency (so that batteries only need to be replaced at long intervals) or a solar cell for recharging the camera's battery.

Remote cameras are not dedicated WiFi cameras, an only occasionally, or by happenstance, use a WiFi signal for transferring (uploading or streaming) footage to a storage or media server. The same is true for the camera of a smartphone, which only connects to a WiFi network on occasion and has other means of connecting to communications network such as the Internet. Furthermore, smartphones (and other similar mobile devices) are not dedicated camera devices but are rather complex technological devices that include an integrated camera which is merely one of the many components and features of the device. The camera function has to be specifically selected and activated in order to capture footage. Streaming of the footage entails many additional steps and additional preparation before being possible.

SUMMARY OF THE INVENTION

The present invention successfully addresses the shortcomings of the currently known configurations by providing a simple gadget that is a dedicated camera (imaging device) and connects to any available WiFi connection that allows streaming of video and/or uploading photos over the Internet via the WiFi connection. No other connection is used as the primary (and in almost all cases the only) connection to the Internet besides for WiFi.

The device includes a touch screen (touch sensitive interface) that displays content and allows the user to select various functions as well as the desired wireless signal and further facilitates the inputting of information such as user names and passwords. All that needs to be done is to select an available WiFi signal (input password if needed) and enter the username and password to log onto the online system account that receives and manages the steamed data. There is no need for complex installation or maintenance.

The dedicated WiFi camera device further includes a powerful processor which is responsible for a whole host of image processing features as well as other functions and features. Many of these features (which are discussed in detail below) are innovatively handled on the device itself, as opposed to being handled by the remote media server.

According to the present invention there is provided an in-place imaging device, including: a housing and a support stand, the housing including: a camera; a wireless communication module; a touch sensitive screen configured for displaying content and receiving input; and a processing unit; wherein the imaging device is adapted to capture footage with the camera and transmitting the footage via the wireless communication module to a network access point.

According to further features in the described preferred embodiments the housing further comprises one or more components selected from the group including: a microphone, a speaker, a rechargeable battery, and a charging port.

According to further features the device further includes at least one of: a temperature sensor, a humidity sensor, a combination temperature and humidity sensor, a light sensor, an activity indicator, and an actuation button.

According to further features the camera further includes at least one of: a wide-angle lens, a plurality of infrared light emitting diodes. According to further features the processing unit includes at least one microprocessor and a graphics processing unit. According to further features the wireless communication module is a WiFi transceiver and the network access point is a WiFi router.

According to further features the support stand includes at least one of: an arm and a base. According to further features the support stand further includes at least one of: a base holder, a hinge interposed between the housing and the arm. According to further features the hinge rotates about one of: a single axis and two intersecting axes.

According to further features the content displayed on the touch sensitive screen is derived from the sensors. According to further features the footage is transmitted to a media server via a communications network to which the network access point is connected. According to further features the footage is transmitted from the media server to a registered computing device.

According to further features the device is further configured to be controlled by the registered computing device.

According to another embodiment there is provided a system for streaming video from an in-place device over a communications network, the system includes: the in-place imaging device; a wirelessly accessible network access point in wireless communication with the device; and a media server, the device configured to stream or upload footage and data from the device to the media server via a communications network to which the network access point is connected.

According to further features the system further includes a registered computing device, the computing device configured to receive the footage and data from the media server via the communications network.

According to further features the data includes content related to the footage, the content derived from the footage by image processing effected on the footage. According to further features the content includes at least one of: motion detection, face detection, facial recognition, light on detection, light off detection. According to further features the data includes values received from sensors integrated into the device.

According to further features the computing device is configured to control the device over the communications network. According to further features the computing device includes a computer program product including computer-readable instructions stored on a non-transient storage medium which cause one or more hardware processors to cause the device to perform one or more operations selected from the group including: displaying content, emit audio content, activate, deactivate, record audio content or video footage.

DEFINITIONS

"Internet Protocol (IP) Network"—An IP network is a communication network that uses Internet Protocol (IP) to send and receive messages between one or more computers. As one of the most commonly used global networks, an IP network is implemented in Internet networks, local area networks (LAN) and enterprise networks. An IP network requires that all hosts or network nodes be configured with the TCP/IP suite. The Internet is the largest and best known IP network.

"WiFi"—WiFi is a technology for wireless local area networking with devices based on the IEEE 802.11 standards. Even though WiFi relates to a specific set of wireless networking standards (relating to specific technologies and protocols), it is made clear that the present invention can be equally implemented on other wireless technologies, protocols and/or standards. Therefore, the term WiFi, as used herein, is merely exemplary and relates to a preferred embodiment of the invention. However, other wireless networks that are capable of providing wireless coverage within an indoor structure such as a house or business office and the like, as well as the immediate environs outside the structure, are included within the scope of the invention and can be substituted for the WiFi technology.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a WiFi camera with a touch screen display and input device according to the present invention may be better understood with reference to the drawings and the accompanying description.

Device

Figure 1:
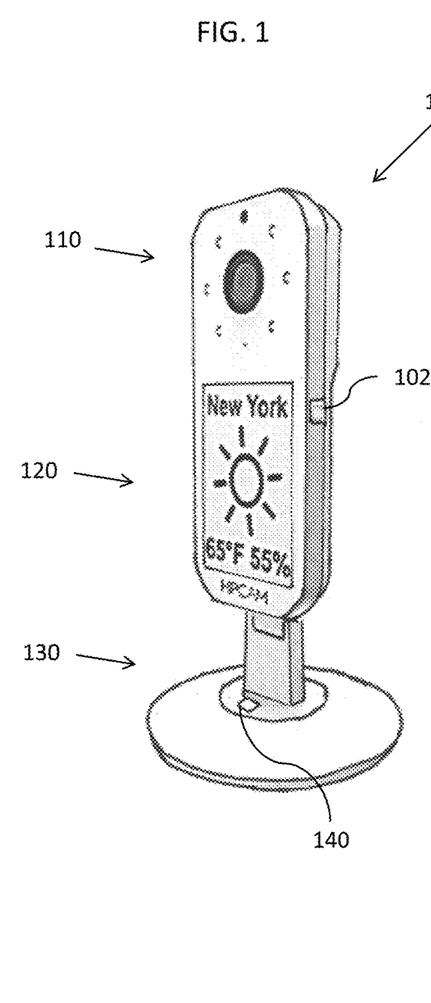
FIG. 1 is an isometric view of the innovative device 100 of the immediate invention.
Figure 2:
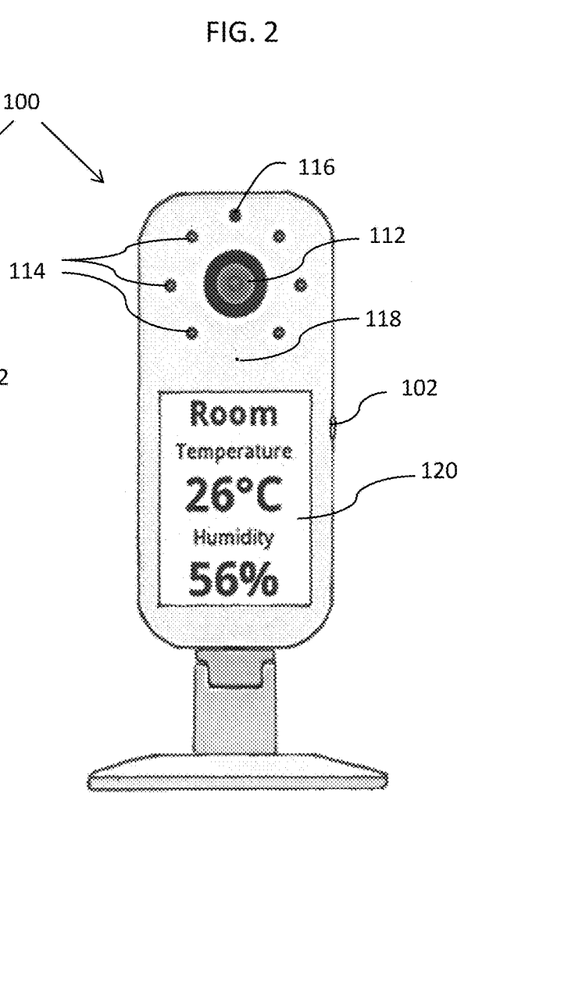
FIG. 2 is a front view of the innovative device 100.

FIG. 1 illustrates an isometric view of the innovative device 100 of the immediate invention. FIG. 2 illustrates a front view of the innovative device 100. Different information is displayed on the device in the two figures. The current invention relates to a dedicated WiFi camera 110 with a touch screen 120 (a touch sensitive screen that functions as a display and a human input device). The components are connected in a way that the user does not need any extra device or technical knowledge to set up a camera to periodically upload footage or stream the footage through the Internet to the system server.

The term "dedicated" is intended to convey the fact that the primary function of the device is to capture and relay images. Furthermore, the device is characterized by the fact that the device is intended to relay images and data from a static position. From a structural point of view, the device is powered (primarily and in normal circumstances) via a power cord connected to the power grid (i.e. plugged into a power outlet). The degree of possible movement is limited by the length of the power cord. Therefore, the camera is a "static" or "in-place" image capture device.

Figure 3:
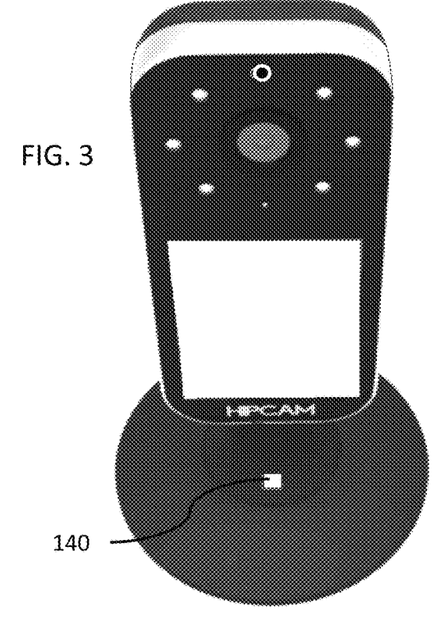
FIG. 3 is an elevated view of device 100.

In embodiments, the device includes further components. Device 100 includes a support stand 130 which is mechanically and electronically coupled to the housing of the main portion of the device. A temperature and humidity sensor 140 is embedded in the base of the stand 130. FIG. 3 is an elevated view of device 100. The sensor 140 is clearly seen in FIG. 3. The elevated view of FIG. 3 clearly shows the base of the stand and the base support component. Support stand 130 is made up of a number of components which are discussed in further detail with regards to FIGS. 6A and 6B.

Figure 4:
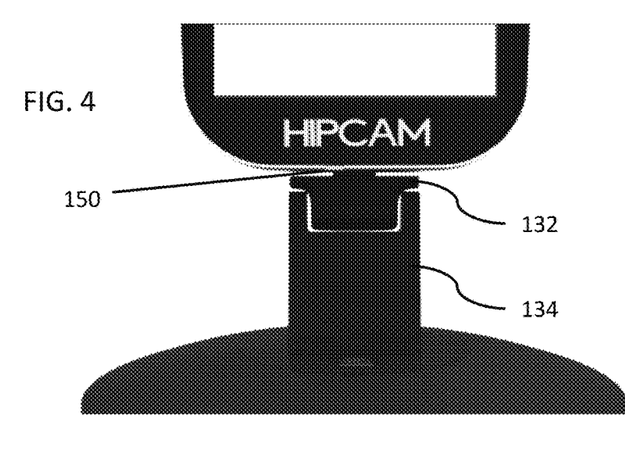
FIG. 4 is a partial front view of the bottom part of device 100.
Figure 5:
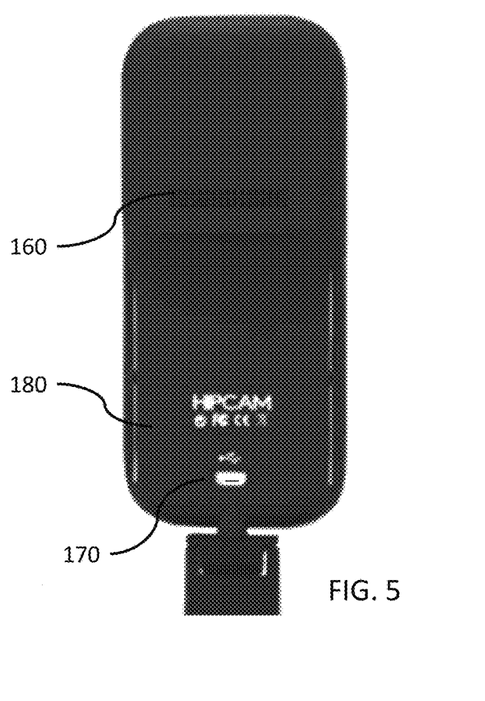
FIG. 5 is a partial back view of device 100.

FIG. 4 is a partial front view of the bottom part of device 100. A microphone 150 is discernable on the bottom edge of the main body of device 100. In preferred embodiments the microphone is a high definition microphone. The device includes bi-directional audio capabilities. FIG. 5 is a partial back view of device 100. A speaker 160 is embedded in the back of the device. In embodiments of the invention, the device includes a built-in siren. In preferred embodiments the siren audio level specification is 90 db. Along with the video streaming, the device and system are capable of streaming audio as well. Such a feature can be utilized in a number of ways. One simple example is using device 100 as an audio visual baby monitor. The audio can be left on through the night, so that the parents can be aware if the baby wakes during the night. Numerous other uses are envisioned, including providing audio information such as medical support via the device. The list of potential uses is endless.

The device is powered via a power cord connected to an electricity outlet. In the depicted exemplary embodiment of device 100, a power port 170 is located on the back panel of the housing. Exemplarily, the depicted power port is a micro USB receptacle (female connector). Device 100 further includes a built-in rechargeable battery 180 (not visible). For example, the rechargeable may be a lithium battery. The battery is for backup in case of a power outage or if the device is moved temporarily away from a power source.

Figure 6A:
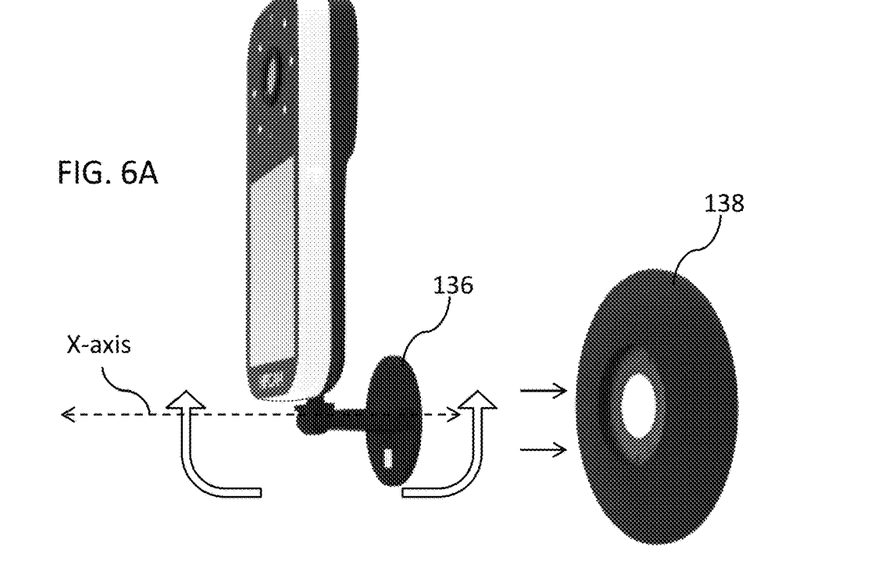
FIGS. 6A and 6B are views of device 100 with support stand 130 in a second arrangement.

FIG. 6A depicts device 100 with support stand 130 in a second arrangement. Support stand 130 includes a swivel hinge 132 which couples the main body of the device (including the camera and touch screen) to a support arm or pillar 134. Arm 134 terminates in a base 136. Base 136 is removeably coupled to a base support member 138. In preferred embodiments the base support member is a magnetic holder. The hinge affords 180 degrees rotation in two axis, a horizontal axis (X-axis) and a vertical axis (Y-axis). The hinge rotates through 180 degrees forwards and backwards about a horizontal axis (X-axis), as depicted by the directional arrows. Rotating the arm backward, perpendicular to standing position depicted in FIGS. 1-5, allows the device to be mounted on a wall or door (or other surface perpendicular to the ground).

Figure 6B:
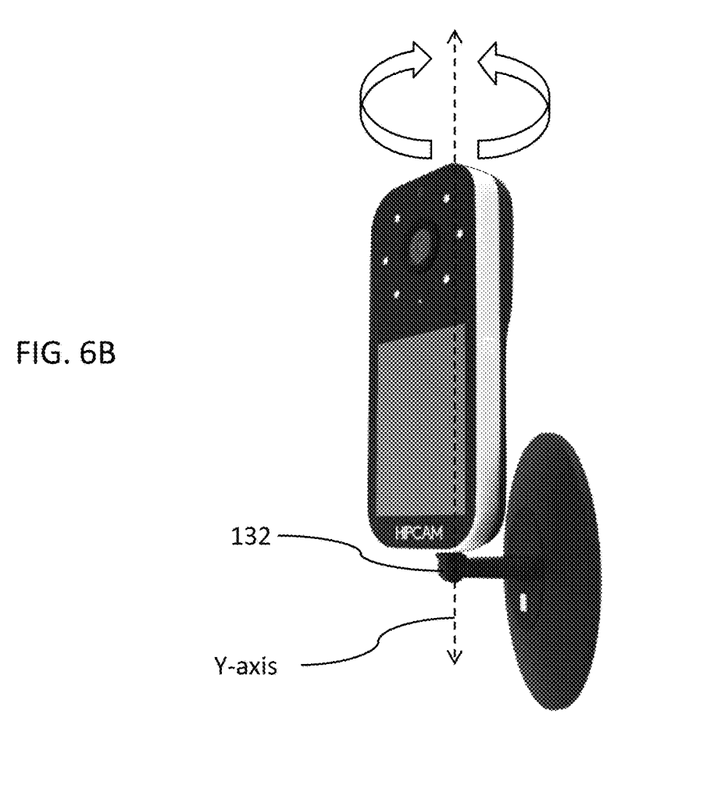

FIG. 6B depicts the device mounted on the holder and slightly swiveled about a vertical axis (Y-axis). Hinge 132 affords the device 180 degrees of rotation about a vertical axis as well.

In preferred embodiments, the magnetic holder includes screw holes to facilitate mounting the holder on a wall. Another manner of mounting the holder may be to adhere a double-sided sticker to the under surface of the holder, and stick the holder on the desired surface. Once mounted on the wall or door (using any relevant mounting means), the base of the device is recoupled to the holder. In some embodiments base 132 is magnetic. In other embodiments the holder is magnetized. In still other embodiments both are magnetized. Of course magnetic coupling is merely one exemplary implementation. Other methods are known in the art and considered within the scope of the invention.

Image Capture

The device includes an imaging suite 110. In embodiments, the imaging suite includes a camera lens 112. In preferred embodiments the camera lens is a high definition camera lens with a 130° wide-angle view. Still and video capabilities of the camera device are discussed below. It is made clear that any relevant type of camera and/or camera lens is considered within the scope of the invention. The type of camera selected is based on the desired image quality and/or streaming capabilities and conditions including compression capabilities.

In embodiments, the suite includes a number of infrared LEDs 114 surrounding the camera lens for night vision (6 IR LEDs are depicted in the exemplary embodiment). Infrared cameras use infrared LED (light-emitting diode) lights located on the outside of the camera lens, so that the light can capture the images even in areas with little to no visible light. The infrared measures the heat emitted from objects in the focus range of the camera. In embodiments, the camera is a day/night camera.

In embodiments, the imaging suite includes a light sensor 116. A light sensor indicates to the processor to switch to low-light or IR settings. In preferred embodiments, the device includes a red-green LED activity indicator 118. Exemplarily, when the device is active and recording/streaming, the indicator is green and when the device is activated but not recording/streaming, the indicator is red. Additional and/or alternative lenses, sensors and components may be included in the imaging suite.

In preferred embodiments, the device includes a powerful processor. For example, the CPU may be a quad-core processor. In preferred embodiments the device includes a powerful graphics processor unit (GPU). The system may be implemented in any manner known in the art. For example, smartphone devices often implement their processing packages on integrated chipsets known as System on a Chip (SoC). An SoC often includes processor core(s), the graphic chipset, the RAM, interface controllers for wired and wireless connections, voltage regulators and more on a combination chipset. In one embodiment, the processing unit of the innovative device is implemented on an SoC. Other implementations, such as multi chip implementations are included within the scope of the invention.

Onboard Sensors

Device 100 includes a number of sensors integrated into the device, the housing and the support stand. In the depicted embodiment, the device includes temperature, humidity and light sensors. Additional sensors known in the art may be included in other embodiments of the device and are considered to be within the scope of the invention. The sensors are electronically coupled to the processing unit.

In addition to functioning as a WiFi (remote) camera which stores and steams video and still footage (as well as audio, as discussed above) the device also includes a touch screen interface that is capable of displaying content. The touch screen display/input interface further distinguishes the present device from other dedicated WiFi (remote) cameras whose primary function is to provide content to a remote locate, but not to display content on the body of the device.

In FIGS. 1 and 2 the touch screen is depicted display different content. On the screen in FIG. 1, the device is displaying the local temperature (65° F.) and humidity (55%). In the depicted exemplary embodiment the device is located in New York, N.Y., USA. The device of the depicted embodiment does not include a GPS chip or a GSM antenna and corresponding cellular communication components. Nonetheless, the device is capable of automatically retrieving geo-location information via or based on the WiFi connection. Once the location is known, the device fetches the relevant information regarding the specific location. The local date and time can be displayed, the temperature and humidity (as depicted in FIG. 1), a three day forecast, the local temperature unit of Fahrenheit or Celsius is automatically detected and displayed and so forth.

FIG. 2 depicts the room temperature in Celsius (i.e. the device is located in a region that measures temperature in Celsius) and humidity percentage. These values are supplied by the temperature and humidity sensor 140. Additional and/or alternative sensors can be integrated in other embodiments of the invention.

Figure 7:
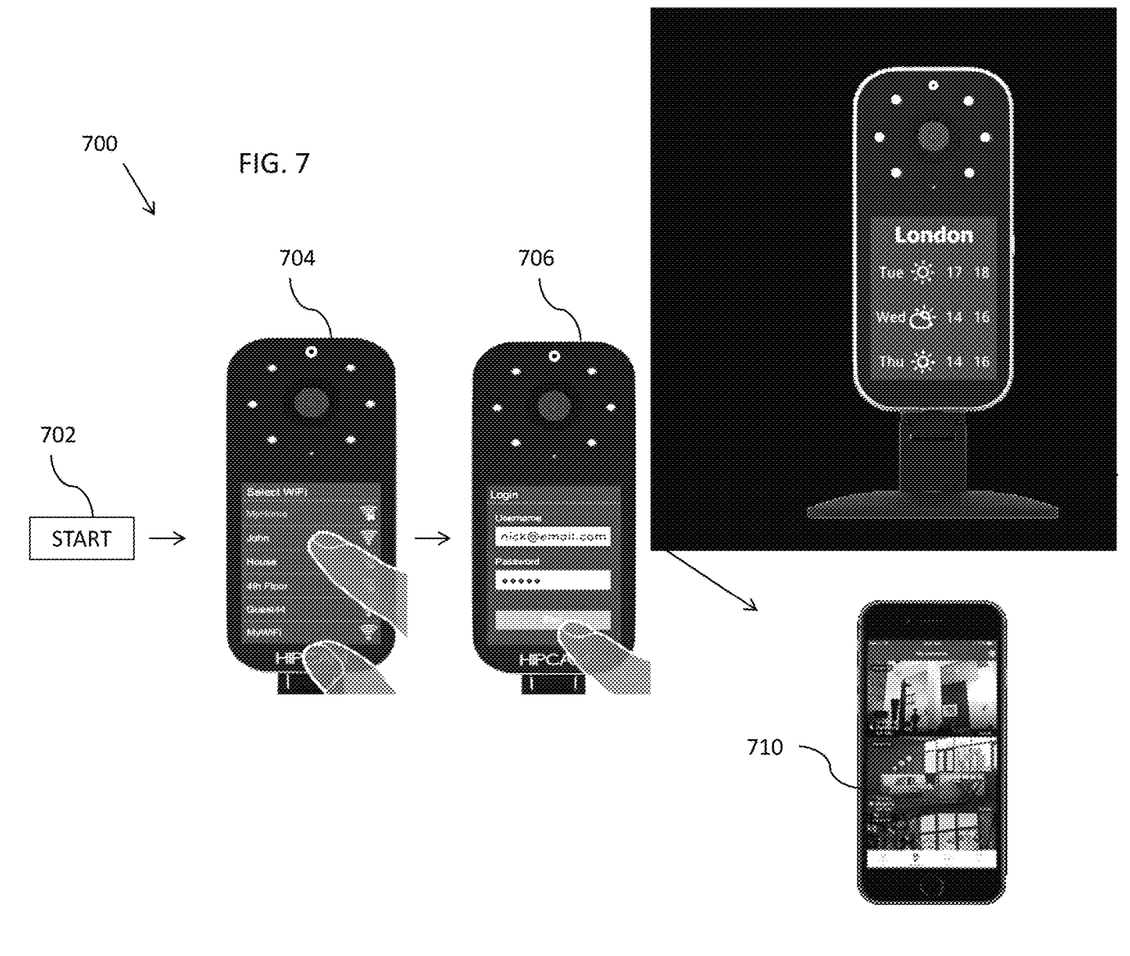
FIG. 7 is a pictorial flow diagram 700 of a method activating and using the innovative device and system.

FIG. 7 illustrates a pictorial flow diagram 700 of a method activating and using the innovative device and system. At step 702 the WiFi camera device 100 is activated. In embodiments, an "On" button 102 (see FIGS. 1 and 2) activates the device. In preferred embodiments, the button 102 is only an activation button, but not a deactivation button. Without a deactivation function, the device cannot be deactivated locally. If the WiFi camera is being used as a surveillance device, then it is preferable that the device not include a button for deactivating the device. Similarly, the backup battery 180 ensures that the device continues to function even if disconnected from a power source. In some embodiments, button 102 can be preprogrammed to deactivate the screen and LEDs to give the impression that the device has been deactivated while actually continuing to record and stream the footage. The aforementioned feature may also be taken advantage of for non-malicious purposes. If the display is disturbing someone in the immediate vicinity of the device he or she can deactivate the screen in order to remove the disturbance.

The innovative device and system is the first WiFi camera designed for mass market penetration; enabling a simpler, faster and more friendly setup, touch screen, on-board detections and streaming on any network. The system primarily creates value by simplifying the setup process and offering an intuitive interface.

After activation, in step 704, the touch screen displays the list of available WiFi connections. Any type of touch screen display is included within the scope of the invention. In the depicted exemplary embodiment, the touch screen is an LCD capacitive touch screen display/HID. The user selects a WiFi connection to connect the camera to the Internet. If needed, the user can input the WiFi router password on a pop-up virtual keyboard. The camera then connects to the Internet.

In step 706, the user logs into his or her account on the system server. The user inserts a preselected username and password, in order to login to the platform that supports the WiFi/touch screen camera. The camera device 100 is now active and functional. The camera device sends the username and password to the server for authentication. Once authenticated, the camera can start streaming video to a media server.

There is no need to register the camera on the router in order to be assigned an IP address by the router. There is no local setup of the device, merely a login procedure. Together with the camera device 100, the user downloads a corresponding mobile app from a participating online app store. The user installs the app and signs up for an account on the service supporting the camera device. The camera is named and added to the list of personal cameras registered to the user.

Once setup is finished, in step 708, the screen displays online information like weather, forecast, time and date or offline information from local sensors like room temperature and humidity. In the exemplary depicted step the device displays the local (London) weather forecast for the next three days.

In step 710, the app is installed and activated. In preferred embodiments the mobile app, or a web interface, allows the user to control one or more camera devices. The most basic feature of the application (mobile or web) is the ability to see streamed footage remotely. Many other features and functions are envisioned for the device and system. Some of these features are discussed in detail below.

Figure 8A:
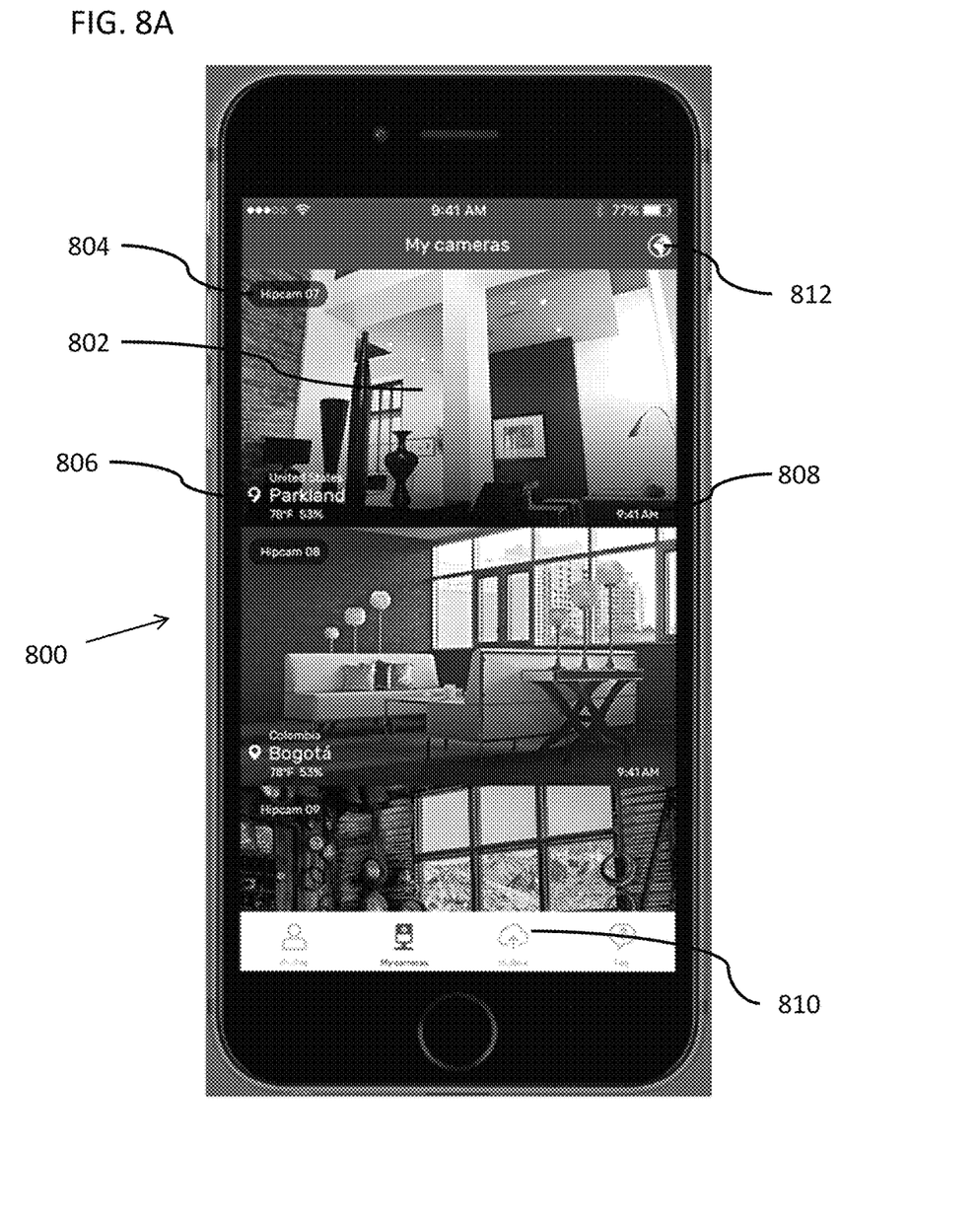
FIGS. 8A and 8B are screenshots of exemplary versions of a mobile app install on a mobile phone 800.

FIG. 8A is a screenshot of an exemplary remote viewing function of an exemplary version of a mobile app install on a mobile phone 800. The screen of the logged-on mobile device shows a number of feeds from different cameras registered to the user, under the "My Cameras" menu. The first feed 802 of is displayed across a segment of the screen. The name of the camera 802, "Hipcam 07", is overlaid in the upper left corner. The location relevant information is overlaid in the bottom left corner. The local time 808 is overlaid the feed in the bottom right corner. Preferences can be set for other information to appear on the live feed. If no live feed is available, or if the user wishes to view an event from the past, the remote storage feature can be selected by touching the cloud icon 810 on the GUI. Another exemplary feature is a global map indicating the location of the user's cameras. The feature can be selected by touching the globe icon 812 in the top right corner of the screen.

Figure 8B:
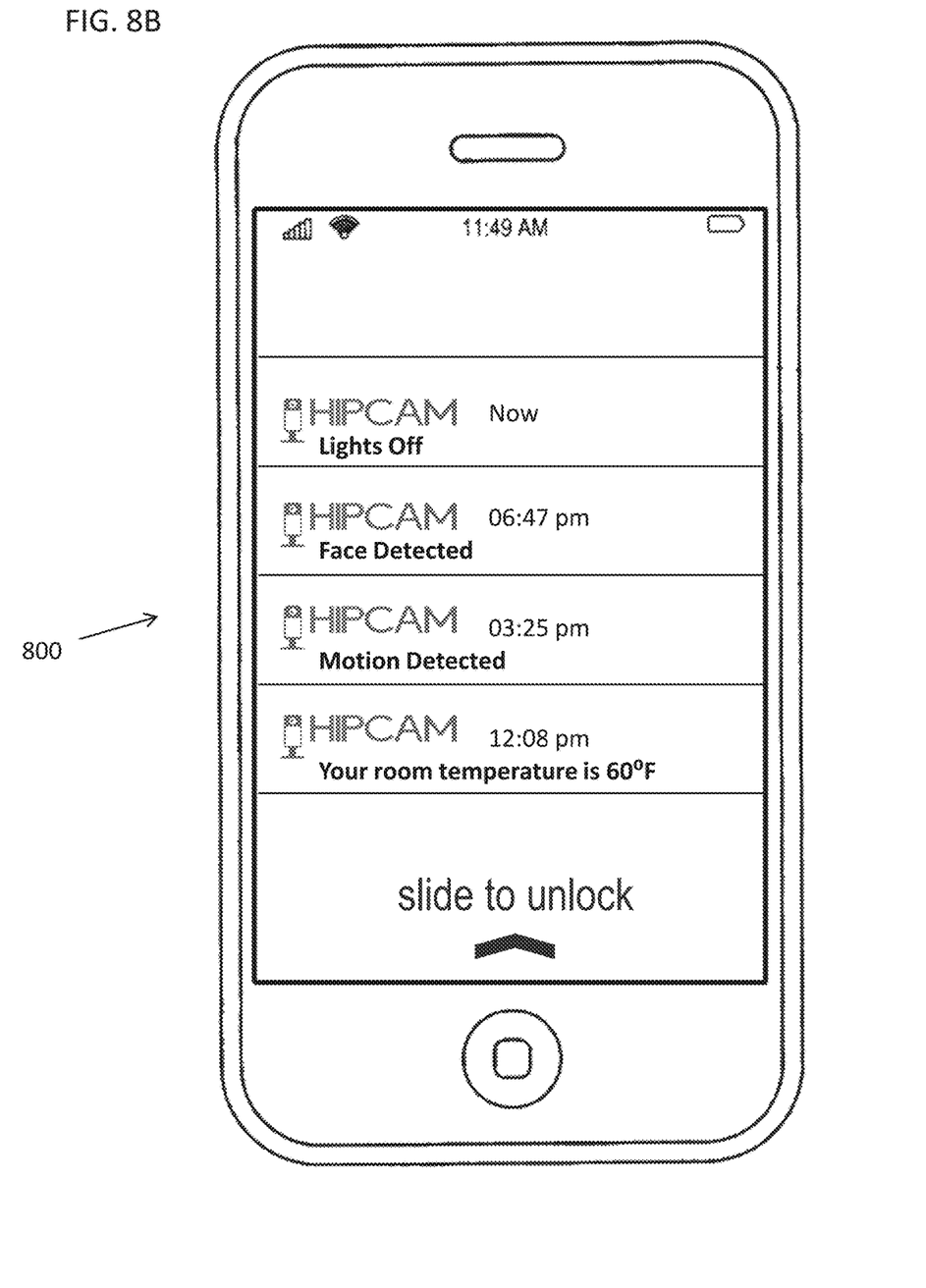

FIG. 8B is a pictorial illustration of mobile device 800 running an app of the present system. The figure displays a screen shot of a notification page for a cellular mobile device (e.g. even when the app is only running in the background, the notifications are received). Notifications are generated and/or scheduled by the device 100 or system server or a combination of the two. Preferences, schedules and other settings can be selected on the mobile device running the innovative application of the present invention.

The software for the mobile application or web interface is a computer program product comprising computer readable instructions stored on a non-transient storage medium and uploaded to RAM by the processor unit of the computing device. The computer program product includes computer-readable instructions. One or more hardware processors are configured to execute the instructions to cause the system to perform operations that have been discussed above and others that are detailed below.

Besides for streaming and other administrative functions discussed above, the image processing is innovatively performed by the device itself. That is to say that the media server or the storage provider do not process the captured footage but rather the onboard image processor in the camera device 100 provides image processing such as, but not limited to: motion detection, face detection, face recognition, geo fencing, light detection. Based on the onboard detections, the camera device sends notifications to the user mobile device. These notifications are sent based on settings, preferences and configuration of the system. Based on the above, it is disclosed that the technology enables on-board video processing for human, motion, sound, temperature and humidity detections.

FIG. 8B includes one notification, arriving at 12:08 pm with the message content "Your room temperature is 60° F.". The temperature sensor reading was sent in a notification based on a predefined setting (e.g. the temperature reaching a threshold, a predetermined time or some other trigger). Another notification reads "Motion Detected" at 3:25 pm. When motion is detected, in an exemplary but preferred embodiment, a notification of the fact is sent together with a 1,280×720 pixels image. The user can switch to a live feed to see who is in the room and respond accordingly. A "Smart Areas" feature allows the user to define an area in the Field of View (FOV) of the static camera device of the present invention where motion is not registered. This is useful when an open window constantly moves a curtain in the FOV of the device, or the leaves of a tree often sway in the wind. Another feature is a geo-fencing feature which demarcates areas beyond which detected motion causes a notification. Alternatively, the areas beyond demarcated boundaries are not monitored for motion, only the areas within the boundaries (i.e. a generalization of the "smart areas" feature).

Another notification reads "Face Detected". Through machine learning and known processes, the software is able to detect human faces (as opposed to a pet or a flapping curtain which will only send a "motion detected" notification). Facial detection can be improved to facial recognition through the aforementioned machine learning. The system can be configured to ignore recognized faces and not send notifications. Alternatively, a particular face can be taught to a system and a notification sent when the face is detected. For example, the face of an individual who has a restraining order can be entered/learned by the software and a special notification, e.g. to law enforcement, can be sent if that face is detected.

The top most notification reads "Lights Off" where the notification is triggered by the light sensor sensing a change in condition from lights being on to lights being off. The camera device has additional features such as baby night screen and live music. The mobile device user selects the screen content for display from the remote location and can also play music through the speakers.

In order to successfully perform the aforementioned detections on the camera device itself, it is necessary for the footage capture to be of relatively high definition quality. In preferred embodiments the frame size of the image is 1,280×720 pixels with the scanning type of progressive scanning (p) and a frame rate of 24 frames per second (fps). This is a common high definition video mode which is often annotated 720p24. While the 720p24 is a preferred video mode, it is made clear that the selection of this mode is preferred by not exclusive, and other high definition modes are also included within the scope of the invention.

Other common high definition video modes include:

1,920×1,080 pixels, interlaced scanning (annotated 1080i) and one of 25 (50 fields/s), 29.97 (59.94 fields/s), 30 (60 fields/s) frame rates;

1,920×1,080 pixels, progressive scanning (1080p) and one of: 24 (23.976), 25, 30 (29.97), 50, 60 (59.94) frame rates; and 2,560×1,440 pixels, progressive scanning (1440p) and one of: 24 (23.976), 25, 30 (29.97), 50, 60 (59.94) frame rates.

However, the higher the image definition, the larger the volume of data to be streamed. High volume streaming can be easily accomplished with broadband connections. However, the present, innovative device and system provide service for any network condition, including communication networks that do not have high bandwidth connections, as is the case most the regions in the world. To this end, the camera device uses advanced video encoding techniques that enable streaming on any network condition, due to the high video compression technology which allow the system to employ the lowest bitrate streaming in industry.

Not only is the bit rate the lowest, the connection is also extremely secure with 128-bit AES with TLS/SSL end to end encryption for streaming and data—both between the camera device and the media server and between the media server and mobile user device.

Figure 9:
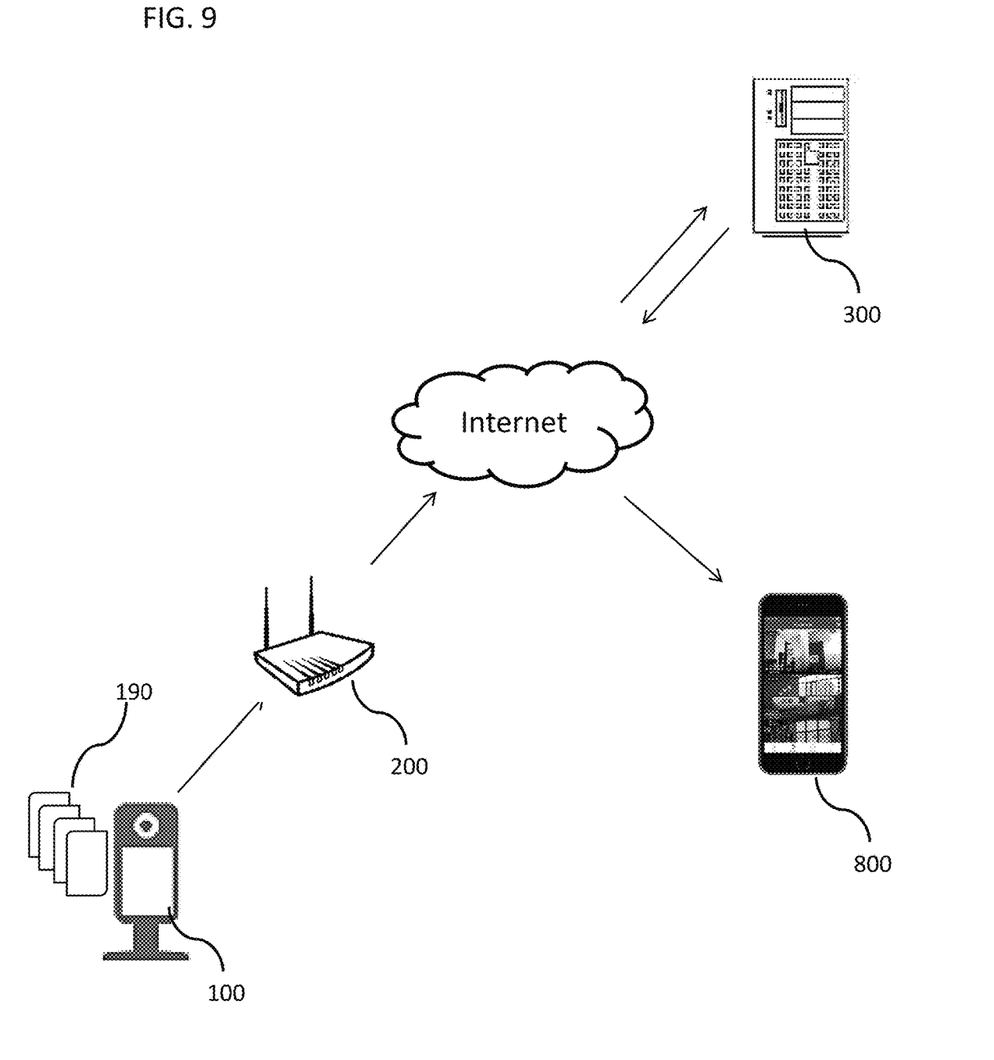
FIG. 9 is a high level pictorial diagram of the innovative system.

FIG. 9 depicts a high level pictorial diagram of the innovative system. In preferred embodiments, the footage (stills, video) is captured by camera device 100. The camera device is wirelessly coupled to a WiFi router 200 in preferred embodiments. Alternative wireless technologies have been discussed elsewhere and are considered within the scope of the invention. However, since the WiFi wireless network is the most common residential wireless solution, the presently disclosed embodiment includes a WiFi router connected to Local Area Network (LAN). The LAN is the access point to the Internet. Footage and data are uploaded and/or streamed over the Internet to a dedicated server 300 (including a plurality of servers) which offers various features and services. One service is a storage service. Preferably the server stores all the captured footage (either for a predetermined amount of time or indefinitely or based on storage size or other options). The app or web interface allow the registered user to view Video History from the cloud (or other storage arrangements). In preferred embodiments the footage is recorded 24 hours a day, 7 days a week. The app/web interface include features for saving, storing, downloading and sharing content from clips in Video History or time lapses.

Other preferred services include sending notifications to account holders. In preferred embodiments, the notifications are sent to one or more registered mobile communication devices (e.g. a smartphone). One exemplary embodiment of the notification system is depicted in FIG. 8B. In some embodiments, notifications are additionally, or alternatively, sent to contracted security companies or local authorities. For example, one feature of the innovative WiFi camera of the immediate invention is motion sensing (discussed above in further detail); if the homeowners are on vacation they can set the innovative system to notify the local police (or a security firm) if motion is detected in the house. Notifications can be sent on a periodic basis (e.g. once a day at a predetermined time) or as an event occurs (e.g. motion detected).

Another preferred service is streaming to a remote computing device. In preferred embodiments, a registered user can log onto a website using a computer (desktop, laptop, tablet computer etc.) or activate a mobile application on a mobile device (e.g. smartphone 800) and view the footage that is being streamed to the server 300 and from the server to the mobile device 800.

Due to the fact that the WiFi camera of the present innovation does not have an IP address of its own, the web or mobile application receives that streaming footage from the system server (e.g. using a streaming engine, a media server). There is no IP address to log onto to view the footage.

In preferred embodiments, the camera device becomes a smart information center for the home or office. A dedicated API enables full IOT management and connection. For example, if the HVAC system is wirelessly enabled, a remote user can check the room temperature where the camera device is residing and adjust the HVAC setting accordingly. All from the remote location, using the web or mobile application to access the camera device which can send wireless instructions to the HVAC system, thanks to the API.

Element 190 is a diagrammatic representation of the onboard applications, functions, features, and services that are innovatively integrated into the camera device 100 instead of appearing in media servers as is known in the art. The onboard image processing, motion, face and light detection, temperature and humidity sensing, display of geo-location correct information and other features and functions discussed above are unique to the present device relative to similar devices in the field of art. In known systems, image processing is performed by media servers. Local sensing is nonexistent. Touch screen display and input is not know in the field of dedicated remote cameras. Additional distinguishing elements, components and features have been discussed elsewhere herein.

In preferred embodiments, the innovative platform can be fully managed from system CRM. The system CRM enables the management of the entire business in real time, enabling reports, geolocation activities, pre-defined settings, features, build product packages, promotions, real time cost and revenues calculations and more.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An in-place imaging device, comprising:
   (a) a housing, said housing comprising:

(i) a camera;
(ii) a wireless communication module;
(iii) a processing unit; and
(iv) a touch sensitive screen configured for displaying content and receiving input, wherein a lens of said camera and said touch sensitive screen are disposed on a same surface; and
(b) a support stand mechanically and electronically coupled to said housing, said support stand including:
(i) a temperature sensor embedded in said support stand, for sensing the temperature in an immediate area surrounding the in-place imaging device and displaying said temperature on said touch sensitive screen;
wherein the imaging device is adapted to capture footage with said camera and transmitting said footage via said wireless communication module to a network access point.

2. The device of claim 1, wherein the housing further comprises one or more components selected from the group including: a microphone, a speaker, a rechargeable battery, and a charging port.

3. The device of claim 1, further comprising at least one of: a humidity sensor, a combination temperature and humidity sensor, and a light sensor.

4. The device of claim 1, wherein said lens is a wide-angle lens surrounded by a plurality of infrared light emitting diodes.

5. The device of claim 1, wherein said processing unit includes at least one microprocessor and a graphics processing unit.

6. The device of claim 1, wherein said wireless communication module is a WiFi transceiver and said network access point is a WiFi router.

7. The device of claim 1, wherein said support stand includes at least one of: an arm and a base.

8. The device of claim 7, wherein said support stand further includes at least one of: a base holder, a hinge interposed between said housing and said arm.

9. The device of claim 8, wherein said hinge rotates about one of: a single axis and two intersecting axes.

10. The device of claim 3, wherein said content displayed on said touch sensitive screen is derived from said sensors.

11. The device of claim 1, wherein said footage is transmitted to a media server via a communications network to which said network access point is connected.

12. The device of claim 11, wherein said footage is transmitted from said media server to a registered computing device.

13. The device of claim 12, further configured to be controlled by said registered computing device.

14. A system for streaming video from an in-place device over a communications network, the system comprising:
the device of claim 1;
a wirelessly accessible network access point in wireless communication with the device; and
a media server, said device configured to stream or upload footage and data from the device to said media server via a communications network to which said network access point is connected, said data including face detection in said footage.

15. The system of claim 14, further comprising a registered computing device, said computing device configured to receive said footage and data from said media server via said communications network.

16. The system of claim 15, wherein said data includes content related to said footage, said content derived from said footage by image processing effected on said footage.

17. The system of claim 16, wherein said content includes at least one of: motion detection, facial recognition, light on detection, light off detection.

18. The system of claim 15, wherein said data includes values received from sensors integrated into the device.

19. The system of claim 15, wherein said computing device is configured to control the device over said communications network.

20. The system of claim 19, wherein said computing device includes a computer program product including computer-readable instructions stored on a non-transient storage medium which cause one or more hardware processors to cause the device to perform one or more operations selected from the group including: displaying content, emit audio content, activate, deactivate, record audio content or video footage.

* * * * *